US005756175A

United States Patent [19]

Washburn

[11] Patent Number: 5,756,175

[45] Date of Patent: May 26, 1998

[54] CONSTRUCTION FOR A BUSINESS FORM HAVING A REMOVABLE LABEL

[75] Inventor: David E. Washburn, Kettering, Ohio

[73] Assignee: The Standard Register Company, Dayton, Ohio

[21] Appl. No.: 749,378

[22] Filed: Nov. 6, 1996

Related U.S. Application Data

[63] Continuation of Ser. No. 410,693, Mar. 27, 1995, abandoned.

[51] Int. Cl.$^6$ ............ B32B 3/10; B32B 3/06

[52] U.S. Cl. ............ 428/42.3; 428/78; 283/81

[58] Field of Search ............ 428/40.1, 42.2, 428/42.3, 67, 78; 283/81

[56] References Cited

U.S. PATENT DOCUMENTS

| | | | |
|---|---|---|---|
| D. 352,310 | 11/1994 | Edwards | D19/32 |
| 4,208,235 | 6/1980 | Stewart | 156/353 |
| 4,379,573 | 4/1983 | Lomeli et al. | 428/42 |
| 4,854,610 | 8/1989 | Kwiatek | 156/234 |
| 5,011,559 | 4/1991 | Felix | 156/257 |
| 5,098,759 | 3/1992 | Felix | 428/42 |
| 5,129,682 | 7/1992 | Ashby | 283/81 |
| 5,271,787 | 12/1993 | Hoffmann et al. | 156/268 |
| 5,279,875 | 1/1994 | Juszak et al. | 428/42.3 |
| 5,320,387 | 6/1994 | Carlson | 283/75 |
| 5,403,236 | 4/1995 | Greig | 462/6 |
| 5,410,136 | 4/1995 | McIntire et al. | 235/380 |
| 5,413,830 | 5/1995 | Edwards | 428/40 |

*Primary Examiner*—Alexander Thomas
*Attorney, Agent, or Firm*—Killworth, Gottman, Hagan & Schaeff, L.L.P.

[57] ABSTRACT

A business form construction containing a removable label is provided. The construction includes a substrate having a window therein, a liner ply adhered to the substrate which covers the window, and at least one label which is adhered to the liner ply. The liner ply is adhered to the substrate by a pressure sensitive adhesive which is on either the periphery of the liner ply or on the periphery of the window of the substrate. The label may be adhered to the liner ply by a pressure sensitive adhesive or a releaseable adhesive. A preferred method of making the construction includes die-cutting a window in the substrate, applying a pattern of adhesive on the substrate around the periphery of the window, and placing the liner ply carrying the label on the substrate.

31 Claims, 4 Drawing Sheets

CONSTRUCTION FOR A BUSINESS FORM HAVING A REMOVABLE LABEL

This application is a continuation of Ser. No. 08/410,693, filed Mar. 27, 1995, now abandoned.

BACKGROUND OF THE INVENTION

This invention relates to a construction for a business form containing a removable label, and more particularly to a construction in which a removable label is provided within a window on the form so as to minimize the overall thickness of the form and to minimize thickness variations across the form for printing and handling operations.

In the manufacture of business forms, it is often desirable to include a label on the form which may be removed and applied to another surface for a variety of uses. For example, such a label may be provided with return address information so that the label can be removed from the form and used to send a reply. Removable labels may also be provided in the form of a coupon or identification tag. The use of forms containing removable labels allows the completion of a wide variety of different business transactions in a convenient manner.

Typically, such forms are manufactured using a "piggy-back" construction in which a label having a pressure sensitive adhesive on one side is adhered to a silicone release liner. The silicone release liner carrying the label also has a pressure sensitive adhesive on one side and is adhered to a second silicone release liner. When applying the individual labels to a business form, the second release liner is removed and the first release liner carrying the removable label is adhered to the form. However, because one liner is thrown away when the label is affixed to the form, such a construction results in a significant waste of material which increases the cost of the final product. In addition, a build-up in thickness of the form results from the combined used of the label, release liner and adhesive layers therebetween. As a consequence, such forms are difficult to process as the difference in caliper between the labels and the remainder of the form often causes feeding and handling problems in printers.

Further handling problems are often caused by the adhesives used to adhere the labels to the forms. For example, many adhesives tend to soften when passed through a laser printer, the fuser rolls of which operate at high temperatures.

In another type of construction (commonly referred to as a "tip-on" label), a label adhered to a release liner is glued onto the front of a paper web, thus eliminating the need for a second release liner. However, while this construction results in less waste and reduced production costs, printing and handling problems may still result from the overall thickness of the form due to the combined use of the label, liner and adhesive and from the difference in caliper between the thickness of the label and the remainder of the form.

More recently, attempts have been made to reduce the thickness of the construction by incorporating a removable label into the document substrate itself. This is typically accomplished by die cutting the front of the document, applying adhesive to the back of the substrate in the area of the label, and attaching a release liner material to the back of the document. See, for example, U.S. Pat. No. 5,011,599 to Felix. However, such a construction is limiting in that the same material must be used for both the label and the document substrate as the label is formed from that substrate. Further, the shape of the label must correspond to the shape of the die-cut area.

Accordingly, the need still exists in the art for an improved construction for providing a label on a form which has a reduced thickness for printing and handling operations, which is easily manufactured, and which allows the label to be comprised of a different material than the material comprising the form.

SUMMARY OF THE INVENTION

The present invention meets those needs by providing a business form construction in which a removable label is included within a window on the form such that the form has reduced overall thickness and reduced difference in caliper between the thickness of the label and the remainder of the form. The construction may be easily processed without the printing and handling problems of prior art piggy-back or tip-on labels.

According to one aspect of the present invention, a business form construction is provided comprising a substrate having first and second major surfaces and having a window therein, a liner ply having first and second surfaces which is adhered to the substrate around the window, and at least one printable, removable label having first and second surfaces which is adhered to the liner ply within the window in the substrate.

In one embodiment of the invention, the substrate includes an adhesive on its second surface around the perimeter of the window, and the first surface of the liner ply is adhered to the substrate around the perimeter of the window such that the window is covered by the liner ply and such that the liner ply is not coplanar with the substrate. The liner ply may be just slightly larger than the perimeter of the window, or it may extend well beyond the perimeter of the window. For example, the liner ply may comprise a strip of material which extends across the length or width of the form.

The removable label is preferably adhered to the first surface of the liner ply within the window of the substrate such that the label is not fully coextensive, i.e., does not overlap the perimeter of the window. In a preferred embodiment, the second surface of the removable label includes a pressure sensitive adhesive which adheres to the liner ply, and the liner ply includes a release coating which allows the label to be readily peeled off the liner ply. Alternatively, the removable label may contain a releaseable adhesive on its second surface such that the label has a non-tacky surface when removed from the liner ply.

In an alternative embodiment of the invention, the liner ply may be adhered to either the first or second surface of the substrate around the perimeter of the window. In one embodiment, the first surface of the liner ply includes a pattern of pressure sensitive adhesive around its periphery and a release coating in the area which covers the window of the substrate. In another embodiment, the first surface of the liner ply includes a transferable pressure sensitive adhesive which adheres the liner ply to the substrate and to the removable label. When the label is subsequently peeled from the liner ply, the pressure sensitive adhesive is transferred to the label such that the label may be adhered to another surface. In this embodiment, it is preferred that the label be coextensive with the window of the substrate so that the adhesive on the liner ply is not exposed and will not interfere with the printing operation.

The substrate and label may be comprised of the same or different materials, depending on the desired application. In one embodiment, the substrate is preferably comprised of paper, while the label is comprised of a material selected from the group consisting of paper, polymers, and metal foil. In a preferred embodiment of the invention, the removable label is comprised of a different material than the substrate, where the substrate is comprised of paper and the label is comprised of a material selected from the group consisting of polymers and metal foil.

If desired, more than one label may be included inside the window of the substrate. In addition, the shape of the removable label may differ from the shape of the window, depending on the desired application.

In a preferred embodiment of the invention, the substrate comprises a continuous web having a series of spaced apart labels to facilitate printing and handling by automated equipment.

A method of making the business form construction is also provided and comprises the steps of removing a portion of the substrate such that a window is formed within the substrate. Preferably, the window is formed by die cutting the substrate and removing the die cut portion. A liner ply is then adhered to the perimeter of the window with an adhesive such that the liner ply covers the window. The liner ply may be attached to the substrate by applying a pressure sensitive adhesive to the surface of the substrate around the perimeter of the window, or by applying an adhesive to the periphery of the liner ply as described above.

The removable label is then adhered to the liner ply within the perimeter of the window by a pressure sensitive adhesive or other suitable adhesive.

In practice, the form may be printed with variable and/or nonvariable information by a variety of printers including nonimpact printers such as laser and ion deposition printers. The use of a removable label contained within the window of the substrate reduces the overall thickness of the form and also reduces the difference in caliper between the label and the remainder of the form. Thus, this construction provides easier processing and handling through a variety of printers.

Accordingly, it is a feature of the present invention to provide a business form construction comprising a substrate, liner ply, and removable label which has reduced thickness and which may be processed without printing and handling problems. It is another feature of the present invention to provide a form construction in which the difference in caliper between the label and the remainder of the form is reduced. These, and other features and advantages of the present invention will become apparent from the following detailed description, the accompanying drawings, and the appended claims.

DETAILED DESCRIPTION OF THE PREFERRED EMBODIMENTS

Figure 1A:
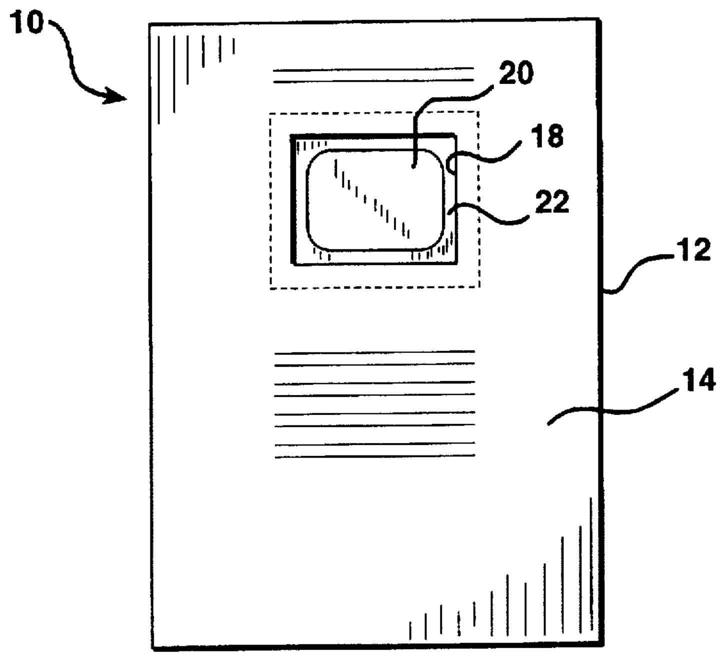
FIG. 1A is a top plan view of the business form construction in accordance with the present invention.
Figure 1B:
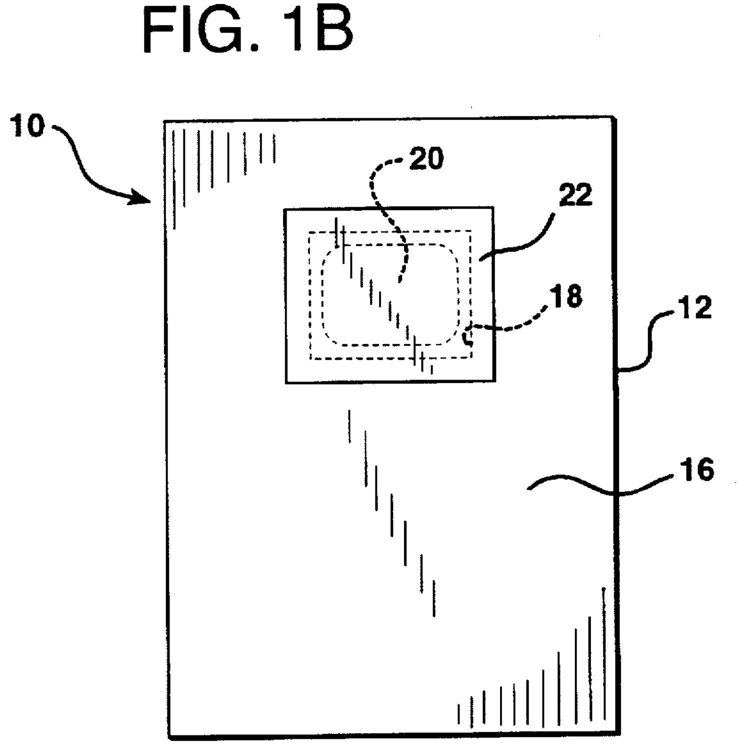
FIG. 1B is a bottom plan view of the construction of FIG. 1A.

The business form construction of the present invention is illustrated in FIGS. 1A and 1B and includes a substrate 12 having first surface 14 and second surface 16. The substrate includes a window 18 and a removable label 20 within the window which is adhered to liner ply 22. By "window", it is meant a cut-out area on the substrate which can be of any size, shape, or location within the substrate. While illustrated as a rectangular window, it will be appreciated that any other geometric shape may be used. It will also be appreciated that there may be two or more windows in a substrate. As shown in FIG. 1B, a liner ply 22 is adhered to the second surface 16 of the substrate and covers the window. In the embodiment shown, the liner ply 22 extends just beyond the perimeter of the window of the substrate. However, if desired, the liner ply may extend further beyond the window. For example, the liner ply may comprise a continuous strip which runs the entire length or width of the form.

As described above, the substrate preferably comprises paper, while the label may be comprised of papers, polymers, or metal foil. The substrate is preferably comprised of a 24# bond paper web while the label comprises 5 mil (0.13 cm) Kimdura (trademark) label face stock, commercially available from Kimberly Clark.

The liner ply should be as thin as possible so that it will not add extra thickness to the substrate which could cause jamming when passed through a printer. The liner ply preferably comprises a silicone polymer coated 2 mil (0.005 cm) polyester.

It should be appreciated that because the label is not die cut from the substrate, the shape of the label does not have to conform to the shape of the window in the substrate. While it is preferred that the label be only slightly smaller than the window, it may be of any size or shape as long as it is not coextensive with the substrate. In addition, it is possible to include more than one label within the window of the substrate.

Figure 2:
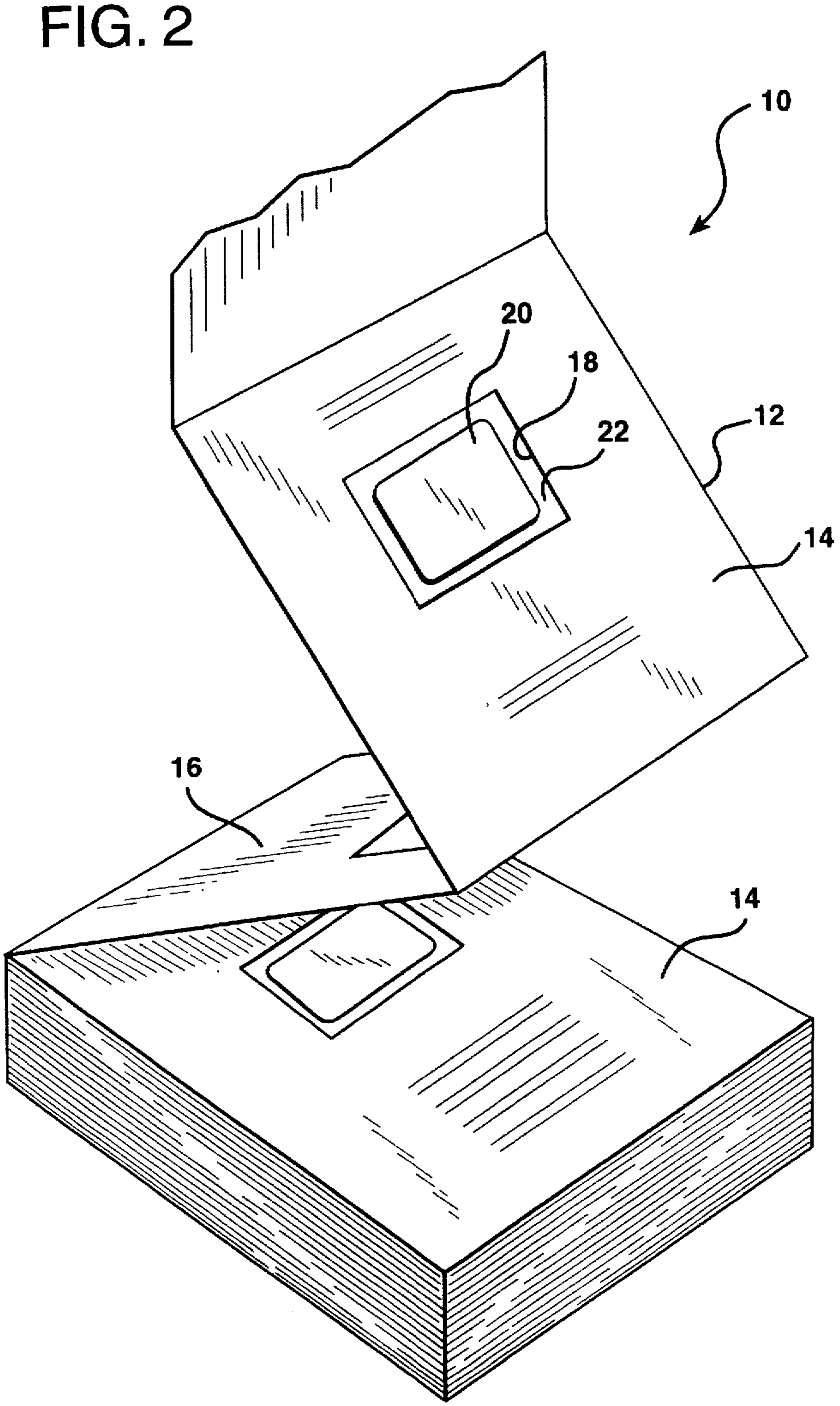
FIG. 2 is a perspective view of a continuous web of forms in accordance with the present invention.

FIG. 2 illustrates a preferred embodiment where the business form construction is in the form of a continuous web containing a series of windows and labels. The web may be folded into a stack as shown and the individual forms later separated for use along lines of weakness.

Figure 3:
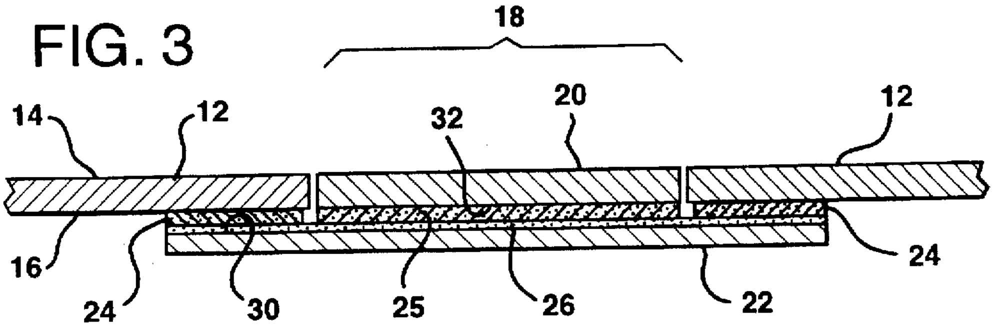
FIG. 3 is a fragmentary sectional view of one embodiment of the form construction of the present invention.

FIG. 3 illustrates one embodiment of the form construction comprising a substrate 12 having a window 18, a removable label 20, and a liner ply 22. An adhesive 24 is included on the second surface 16 of the substrate and secures the first surface 30 of liner ply 22 to the substrate such that window 18 is covered. The preferred adhesive for use in the present invention is a water-based acrylic pressure sensitive adhesive, which is resistant to the heat generated by laser printers. The second surface 32 of removable label 20 also includes a pressure sensitive adhesive 25 which secures the label to the liner ply.

Preferably, the first surface 30 of liner ply 22 includes a coating of a release material 26 which may comprise, for example, a UV curable or heat curable silicone coating. The release coating allows label 20 to be readily peeled from the liner ply.

Figure 4:
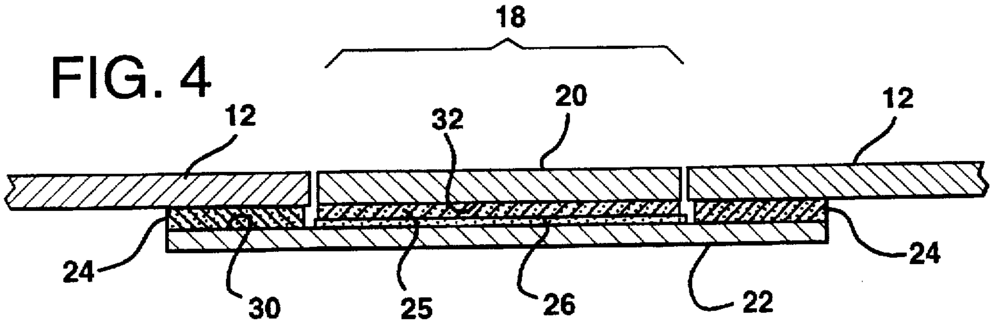
FIG. 4 is a fragmentary sectional view of another embodiment of the form construction of the present invention.

FIG. 4 illustrates an another embodiment of the invention in which the liner ply 22 is adhered to the substrate 12 by a pressure sensitive adhesive 24 included on the periphery of the first surface 30 of liner ply 22. In this embodiment, the liner ply is pattern coated with a release coating 26 so that only the area covered by the label 20 within the window contains the release coat.

Figure 5:
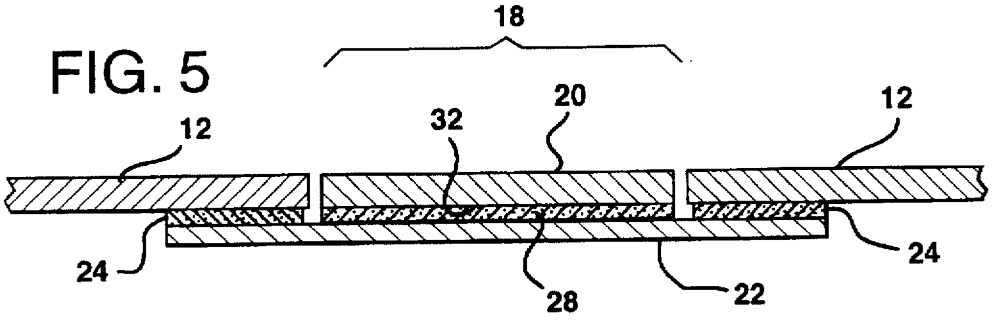
FIG. 5 is a fragmentary sectional view of another embodiment of the form construction of the present invention.

FIG. 5 illustrates yet another embodiment of the invention in which the removable label 20 includes a releaseable adhesive 28 on its second surface 32 such that when the label is removed from the liner ply, it has a non-tacky surface. The use of a releaseable adhesive may be desirable, for example, when the label is to be used as a coupon or identification tag. A suitable releaseable adhesive material for use in the invention may be any adhesive which has a low cohesive strength, bonds well to paper or plastic, and is nontacky to the touch when dry. Preferred releaseable adhesives are water-based polymer latexes or hot melt adhesives such as waxes or polymeric resins such as those taught by Doll et al. U.S. Pat. No. 5,039,652, the disclosure of which is incorporated herein by reference.

Figure 6:
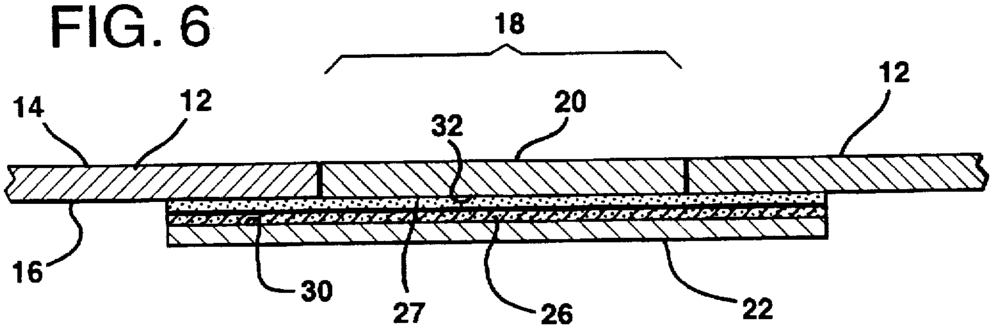
FIG. 6 is a fragmentary sectional view of another embodiment of the form construction of the present invention.

FIG. 6 illustrates yet another embodiment of the invention in which the first surface 30 of liner ply 22 includes a release coating 26 and a transferable pressure sensitive adhesive 27. The transferable pressure sensitive adhesive adheres liner ply 22 to substrate 12 and also adheres label 20 to liner ply 22. When the label is subsequently peeled from the liner ply, the pressure sensitive adhesive is transferred to the label such that the label may be adhered to another surface. In this embodiment, it is preferred that the label be coextensive with the window of the substrate as shown so that the adhesive on the liner ply is not exposed and will not interfere with the printing operation.

Figure 7A:
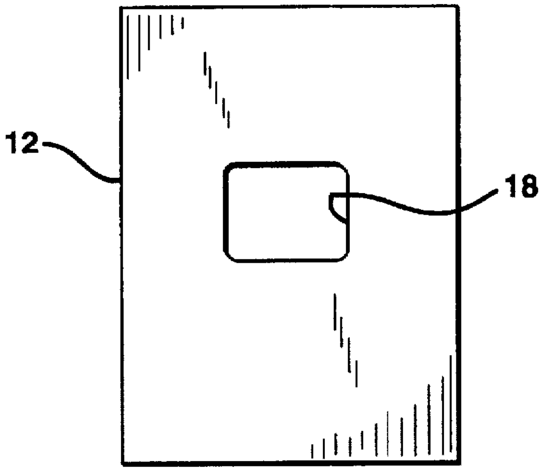
FIG. 7 is a schematic representation of the steps used in making the form construction of the present invention.
Figure 7B:
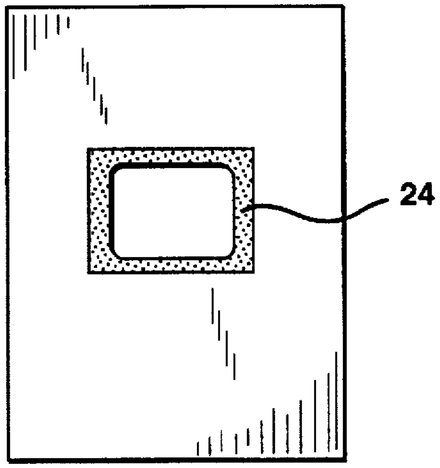
Figure 7C:
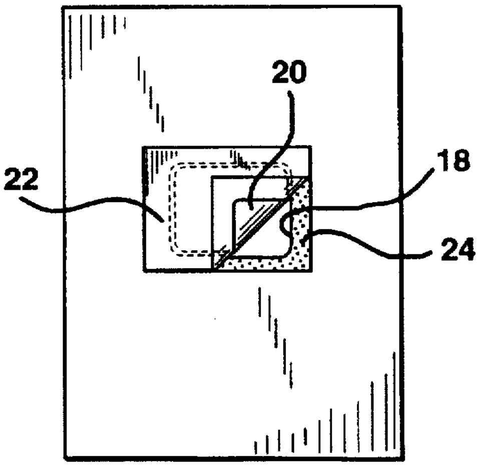

The form construction of the present invention is preferably produced in-line on a continuous web. FIG. 7 illustrates the steps involved in producing a business form construction such as the one shown in FIG. 1A. First, a portion of substrate 12 is die cut, preferably using a low profile or engraved die. The die cut portion of the substrate is then removed to form a window 18. Next, a pattern of adhesive 24 is applied to the first or second surface of the web. The adhesive should be applied as closely as possible to the edges of the die-cut window to provide a strong bond with the liner ply. This prevents the liner ply from coming loose and causing a possible jam when passed through a printer.

After the adhesive is applied, the liner ply 22 is applied to the surface of the web, where the liner ply contains a release coat on its surface. Alternatively, the liner ply may include an adhesive on its periphery with a pattern of release coat. Preferably, the liner ply is already carrying the removable label 20 on its surface when it is applied to the web. In this arrangement, a two-ply label construction is used comprising label stock and liner where the labels are preferably preprinted and die-cut on a conventional label processor or press. A gap is maintained between successive labels and the matrix around the labels is cut and removed. The labels are then delivered to a patcher which cuts off sections of the liner by sensing the matrix gap between the labels and applies the labels to the web such that the label shows through die cut window 18 of the substrate. Alternatively, label 20 may be applied to liner ply 22 after the liner ply has been adhered in place on the substrate.

The completed form may be provided in folded, cut sheet or roll configuration. The forms may be passed through a printer without printing or handling problems due to the minimal thickness of the resulting form and the minimal difference in caliper between the label and remainder of the substrate.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A business form construction containing a removable label comprising:

a) a substrate having first and second major surfaces, said substrate having a window therein and including an adhesive on said second surface around the perimeter of said window;

b) a liner ply having first and second surfaces, with said first surface of said liner ply adhered to the second surface of said substrate around the perimeter of said window such that said window is covered by said liner ply, wherein said liner ply is not coplanar with said substrate; and c) at least one printable, removable label having first and second surfaces, said second surface of said label being adhered to the first surface of said liner ply within said window by an adhesive which remains on said second surface of said label when said label is removed from said construction, wherein said label is comprised of a different material than said substrate.

2. The construction of claim 1 wherein said liner ply extends beyond the perimeter of said window.

3. The construction of claim 1 wherein said label is not coextensive with said window.

4. The construction of claim 1 wherein said substrate comprises paper.

5. The construction of claim 1 wherein said label is comprised of a material selected from the group consisting of paper, polymers, and metal foil.

6. The construction of claim 1 wherein said first surface of said liner ply includes a release coating.

7. The construction of claim 1 wherein said adhesive on said second surface of said removable label comprises a pressure sensitive adhesive.

8. The construction of claim 1 in which the shape of said label is different than the shape of said window.

9. The construction of claim 1 wherein said substrate comprises a continuous web having a series of spaced windows and labels.

10. A business form construction containing a removable label comprising:

a) a substrate having first and second major surfaces, said substrate having a window therein;

b) a liner ply having first and second surfaces, said first surface of said liner ply adhered to said first or second surface of said substrate around the perimeter of said window such that said window is covered by said liner ply, wherein said liner ply is not coplanar with said substrate; and c) at least one printable, removable label having first and second surfaces, said second surface of said label adhered to the first surface of said liner ply within said window by an adhesive which remains on said second surface of said label when said label is removed from said construction, wherein said label is comprised of a different material than said substrate.

11. The construction of claim 10 wherein said liner ply extends beyond the perimeter of said window.

12. The construction of claim 10 wherein said substrate comprises paper.

13. The construction of claim 10 wherein said label is comprised of a material selected from the group consisting of paper, polymers and metal foil.

14. The construction of claim 10 wherein said first surface of said liner ply includes a pattern of pressure sensitive adhesive around its periphery and a pattern of release coating in the area which covers said window.

15. The construction of claim 10 wherein said first or second surface of said substrate includes a pressure sensitive adhesive around the perimeter of said window.

16. The construction of claim 10 wherein said adhesive on said second surface of said removable label comprises a pressure sensitive adhesive.

17. The construction of claim 10 wherein said first surface of said liner ply includes a release coating.

18. The construction of claim 10 in which the shape of said label is different than the shape of said window.

19. The construction of claim 10 wherein said substrate comprises a continuous web having a series of windows and labels.

20. A business form construction containing a removable label comprising:

a) a substrate having first and second major surfaces, said substrate having a window therein and including an adhesive on said second surface around the perimeter of said window;

b) a liner ply having first and second surfaces, with said first surface of said liner ply adhered to the second surface of said substrate around the perimeter of said window such that said window is covered by said liner ply, wherein said liner ply is not coplanar with said substrate; and c) at least one printable, removable label having first and second surfaces, said second surface of said label being adhered to the first surface of said liner ply within said window by an adhesive which remains on said second surface of said label when said label is removed from said construction, and wherein said liner ply includes a release coating on its first surface only on the area covered by said label within the perimeter of said window.

21. The construction of claim 20 wherein said liner ply extends beyond the perimeter of said window.

22. The construction of claim 20 wherein said label is not coextensive with said window.

23. The construction of claim 20 wherein said substrate comprises paper.

24. The construction of claim 20 wherein said label is comprised of a material selected from the group consisting of paper, polymers, and metal foil.

25. The construction of claim 20 wherein said adhesive on said second surface of said removable label comprises a pressure sensitive adhesive.

26. The construction of claim 20 wherein said second surface of said removable label includes a releasable adhesive.

27. The construction of claim 20 in which the shape of said label is different than the shape of said window.

28. The construction of claim 20 in which said release coating is pattern coated on said liner ply.

29. A business form construction containing a removable label comprising:

a) a substrate having first and second major surfaces, said substrate having a window therein;

b) a liner ply having first and second surfaces, said first surface of said liner ply adhered to said first or second surface of said substrate around the perimeter of said window such that said window is covered by said liner ply, wherein said liner ply is not coplanar with said substrate; and c) at least one printable, removable label having first and second surfaces, said second surface of said label being adhered to the first surface of said liner ply within said window by an adhesive which remains on said second surface of said label when said label is removed from said construction, wherein said liner ply includes a release coating on its first surface only on the area covered by said label within the perimeter of said window, and wherein said label is comprised of a different material than said substrate.

30. A business form construction containing a removable label comprising:

a) a substrate having first and second major surfaces, said substrate having a window therein and including an adhesive on said second surface around the perimeter of said window;

b) a liner ply having first and second surfaces, with said first surface of said liner ply adhered to the second surface of said substrate around the perimeter of said window such that said window is covered by said liner ply, wherein said liner ply is not coplanar with said substrate; and c) at least one printable, removable label having first and second surfaces, said second surface of said label being adhered to the first surface of said liner ply within said window by an adhesive which remains on said second surface of said label when said label is removed from said construction, and wherein said first surface of said liner ply is pattern coated with a release coating on less than the entire first surface.

31. A business form construction containing a removable label comprising:

a) a substrate having first and second major surfaces; said substrate having a window therein;

b) a liner ply having first and second surfaces, said first surface of said liner ply having a pattern of pressure sensitive adhesive around its periphery which is adhered to said first or second surface of said substrate around the perimeter of said window such that said window is covered by said liner ply, said liner ply including a pattern of release coating in the area which covers said window, wherein said liner ply is not coplanar with said substrate; and c) at least one printable, removable label having first and second surfaces, said second surface of said label including a pressure sensitive adhesive which is adhered to said first surface of said liner ply within said window and which remains on said second surface of said label when said label is removed from said construction, wherein said label is comprised of a different material than said substrate.

* * * * *